(12) United States Patent
Goodart et al.

(10) Patent No.: US 8,674,901 B2
(45) Date of Patent: Mar. 18, 2014

(54) SYSTEM AND METHOD FOR AUTHENTICATING A DISPLAY PANEL IN AN INFORMATION HANDLING SYSTEM

(75) Inventors: Joseph E. Goodart, Austin, TX (US); David S. Konetski, Austin, TX (US); Bruce C. Montag, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 1030 days.

(21) Appl. No.: 12/427,826

(22) Filed: Apr. 22, 2009

(65) Prior Publication Data

US 2010/0271289 A1 Oct. 28, 2010

(51) Int. Cl.
*G09G 5/00* (2006.01)
(52) U.S. Cl.
USPC ............................................. 345/1.3; 345/3.1
(58) Field of Classification Search
USPC .................. 345/1.3, 3.1, 5; 715/734; 709/233
See application file for complete search history.

(56) References Cited

U.S. PATENT DOCUMENTS

| 6,972,732 | B1 * | 12/2005 | Nishikawa | 345/1.1 |
|---|---|---|---|---|
| 7,012,610 | B2 * | 3/2006 | Turner et al. | 345/519 |
| 7,925,391 | B2 * | 4/2011 | Sanders-Reed | 701/3 |
| 8,004,475 | B2 * | 8/2011 | Vong et al. | 345/1.3 |
| 2005/0166265 | A1 | 7/2005 | Satomi | |
| 2008/0138028 | A1 | 6/2008 | Grady et al. | |
| 2009/0066648 | A1 | 3/2009 | Kerr et al. | |

\* cited by examiner

*Primary Examiner* — Abbas Abdulselam
(74) *Attorney, Agent, or Firm* — Larson Newman, LLP

(57) ABSTRACT

A method includes determining if a display connection is in an information handling system, reading configuration information from a display, determining whether the configuration information identifies the display as an internal device, and training a data link. A memory includes code to perform a method of determining if a display connection is in an information handling system, reading configuration information from a display, determining if the configuration information identifies the display as an internal device, and training a data link. An information handling system includes a memory with code, a display, and a graphics processor that executes the code. The code operates to determine if a display connection is in the information handling system, read configuration information from the display, determine if the configuration information identifies the display as an internal device, and train a data link.

20 Claims, 4 Drawing Sheets

SYSTEM AND METHOD FOR AUTHENTICATING A DISPLAY PANEL IN AN INFORMATION HANDLING SYSTEM

FIELD OF THE DISCLOSURE

This disclosure relates generally to information handling systems, and relates more particularly to displays in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, data storage systems, and networking systems.

An information handling system can include an internal display device, such as a liquid crystal display (LCD) panel, for communicating visual information to a user of the information handling system. An information handling system can also include a port for communicating visual information on an external display device, such as a monitor. Several display interface standards exist that define digital video interconnections between an information handling system and one or more display devices.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are illustrated and described with respect to the drawings presented herein, in which.

The use of the same reference symbols in different drawings indicates similar or identical items.

DETAILED DESCRIPTION OF DRAWINGS

Figure 1:
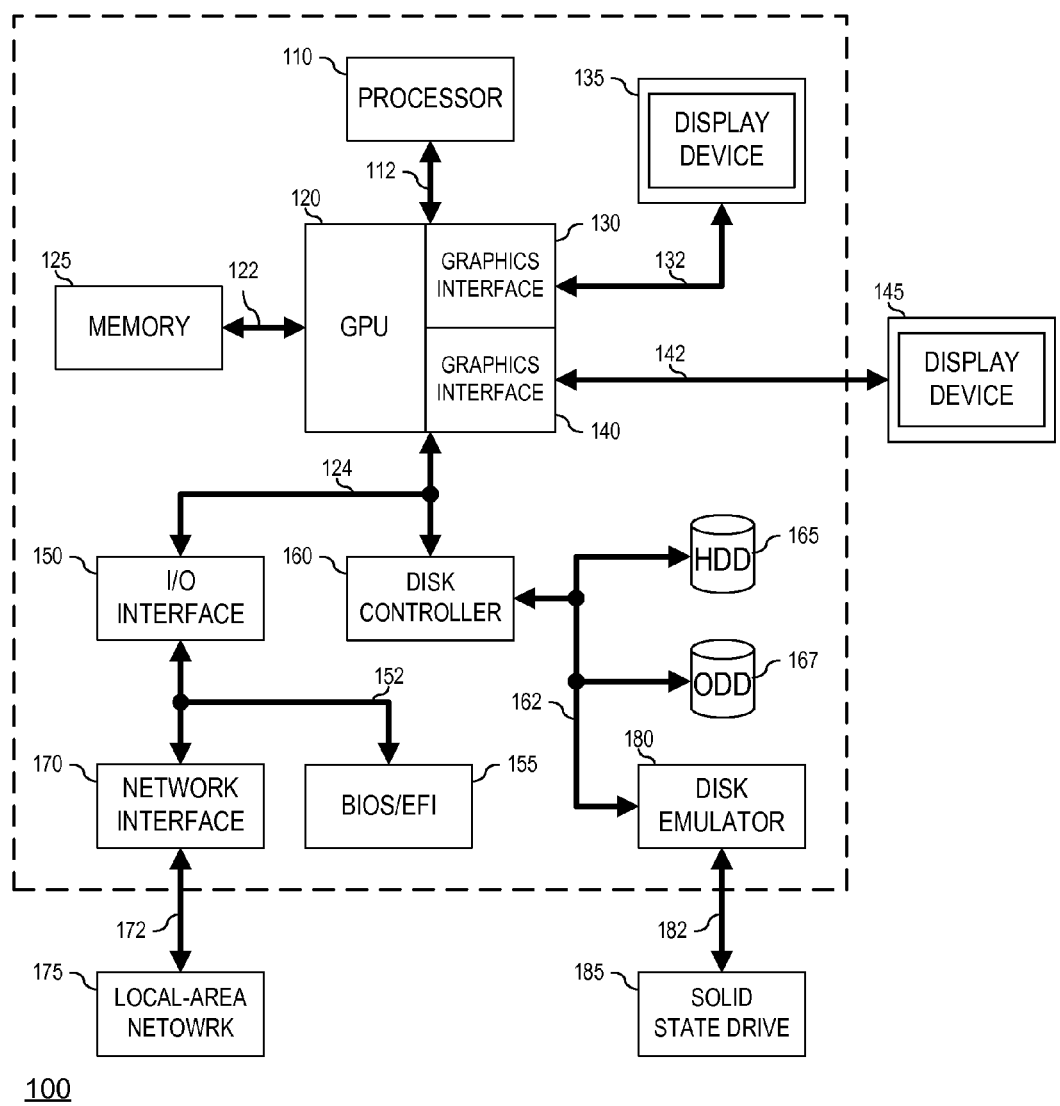
FIG. 1 is a block diagram of an information handling system according to an embodiment of the present disclosure.

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features, but can include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and resources described herein. This is done merely for convenience, and to give a general sense of the scope of the invention. This description should be read to include one, or at least one, and the singular also includes the plural, or vice versa, unless it is clear that it is meant otherwise. For example, when a single device is described herein, more than one device can be used in place of a single device. Similarly, where more than one device is described herein, a single device can be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. In case of conflict, the present specification, including definitions, will control. In addition, the materials, methods, and examples are illustrative only, and not intended to be limiting.

To the extent not described herein, many details regarding specific materials, processing acts, and circuits are conventional, and can be found in textbooks and other sources within the computing, electronics, and software arts.

An information handling system can include a digital video interconnection for communicating visual information to a user. The digital video interconnection can conform to one or more interface standards that define the nature of the digital signals communicated between the information handling system and a display device. Interface standards may define encryption/decryption mechanisms in order to protect the content communicated on an external digital video interconnection. However, the inclusion of encryption/decryption logic may reduce the speed of a digital video interconnection, and increase the cost and complexity of the information handling system and the display device. Thus, when an information handling systems includes an internal display device, avoiding the use of encryption/decryption logic on the internal digital video interface between the information handling system and the internal display device may be desirable.

FIG. 1 illustrates a functional block diagram of an embodiment of an information handling system, generally designated as 100. Information handling system 100 includes a processor 110, a chipset/graphics processing unit (GPU) 120, a memory 125, a display device 135, an input/output (I/O) interface 150, a disk controller 160, a network interface 170, and a disk emulator 180, or any logical combination thereof. Processor 110 is coupled to GPU 120 via interconnect 112. GPU 120 supports processor 110, allowing processor 110 to process machine-executable code. In a particular embodiment (not illustrated), information handling system 100 includes one or more additional processors, and GPU 120 supports the multiple processors, allowing simultaneous processing by each of the processors, permitting the exchange of information between the processors and the other elements of information handling system 100. Interconnect 112 can be a unique channel between processor 110 and GPU 120, or can be a bus that shares information between processor 110, GPU 120, and other elements of information handling system 100.

Memory 125 is coupled to GPU 120 via interconnect 122. Interconnect 122 can be a unique channel between GPU 120 and memory 125, or can be a bus that shares information between GPU 120, memory 125, and another element of information handling system 100. For example, a bus can share information between processor 110, GPU 120 and memory 125. In a particular embodiment (not illustrated), processor 110 is coupled to memory 125 through a unique channel. In accordance with another aspect (not illustrated), an information handling system can include a separate memory dedicated to each of the processors. A non-limiting example of memory 125 includes static, dynamic, or non-volatile random access memory (SRAM, DRAM, or NVRAM), read only memory (ROM), flash memory, another type of memory, or any combination thereof.

I/O interface 150 is coupled to GPU 120 via interconnect 124. Interconnect 124 can be a unique channel between GPU 120 and I/O interface 150, or can be a bus that shares information between GPU 120, I/O interface 150, and another element of information handling system 100. One or more other I/O interfaces (not illustrated) can also be used in addition to I/O interface 150 if needed or desired. I/O interface 150 is coupled to a basic input/output system (BIOS)/extensible firmware interface (EFI) module 155 via interconnect 152. BIOS/EFI module 155 can include BIOS/EFI code that operates to detect and identify resources within information handling system 100, provide the appropriate drivers for those resources, initialize those resources, and access those resources.

Network interface device 170 is coupled to I/O interface 150 via interconnect 152. Interconnect 152 can be a unique channel between I/O interface 150 and network interface device 170, or can be a bus that shares information between I/O interface 150, network interface device 170, and other elements of information handling system 100. Other network interfaces (not illustrated) can also be used in addition to network interface device 170 if needed or desired. Network interface device 170 can be a network interface card (NIC) disposed within information handling system 100, on a main circuit board (e.g., a baseboard, a motherboard, or any combination thereof), integrated into another component such as GPU 120, in another suitable location, or any combination thereof. Network interface device 170 includes a network channel 172 that provides an interface between information handling system 100 and a local area network 175. Network interface device 170 can also include additional network channels (not illustrated).

Disk controller 160 is coupled to GPU 120 via interconnect 124. In another embodiment (not illustrated), disk controller 160 can be coupled to GPU 120 via a unique channel. One or more other disk controllers (not illustrated) can also be used in addition to disk controller 160 if needed or desired. Disk controller 160 can include a disk interface 162 that allows disk controller 160 to be coupled to one or more disk drives. Such disk drives include a hard disk drive (HDD) 165 or an optical disk drive (ODD) 167 (e.g., a Read/Write Compact Disk (R/W-CD), a Read/Write Digital Video Disk (R/W-DVD), a Read/Write mini Digital Video Disk (R/W mini-DVD), or another type of optical disk drive), or any combination thereof. Additionally, disk controller 160 can be coupled to disk emulator 180 via interconnect 162. Disk emulator 180 can permit a solid-state drive 185 to be coupled to information handling system 100 via an external interface 182. External interface 182 can include an industry standard bus (e.g., USB or IEEE 1384 (Firewire)), a proprietary bus, or any combination thereof. Alternatively, solid-state drive 185 can be disposed within information handling system 100.

GPU 120 includes a graphics interface 130 and one or more additional graphics interfaces 140. Graphics interface 130 is coupled to an internal display device 135 via an internal digital video interconnection 132. A non-limiting example of an internal display device 135 includes a liquid crystal display (LCD) panel, a touch-screen panel, another type of display panel, or a combination thereof. Graphics interface 140 is coupled to an external display device 145 via an external digital video interconnection 142. A non-limiting example of an external display device 145 includes a computer monitor, a television, another type of display device, or a combination thereof. Graphics interfaces 130 and 140 provide visual information to display devices 135 and 145, respectively, in accordance with one or more display interface standards that define the signals on digital video interconnections 132 and 142. In a particular embodiment, graphics interfaces 130 and 140 operate in accordance with the same display interface standard. In another embodiment, graphics interfaces 130 and 140 operate in accordance with different display interface standards. A non-limiting example of a display interface standard includes the Low-Voltage Differential Signaling (LVDS) standard, the Digital Visual Interface (DVI) standard, the DisplayPort standard, the High-Definition Multimedia Interface (HDMI) standard, or another display interface standard.

Figure 2:
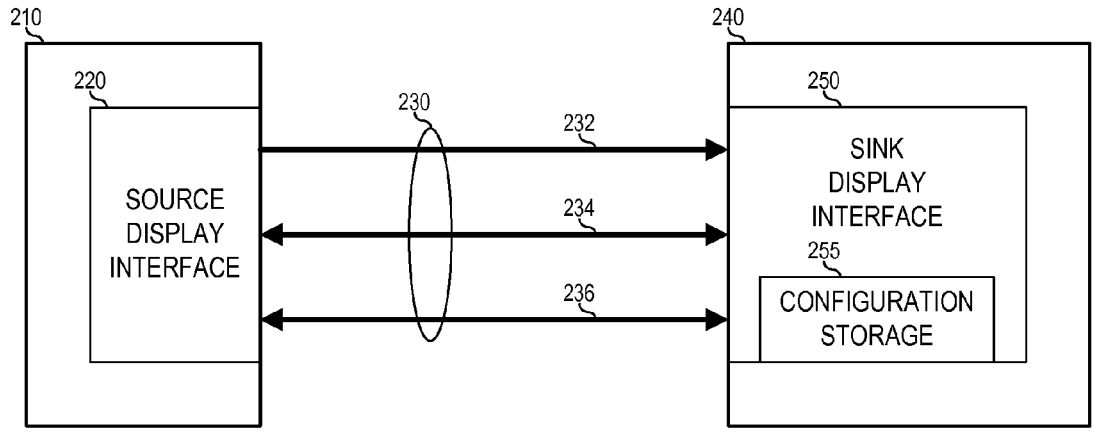
FIG. 2 is a block diagram of a display connection in an information handling system according to an embodiment of the present disclosure.

FIG. 2 illustrates a display connection 200 of an information handling system similar to information handling system 100. Display connection 200 includes a GPU 210 similar to GPU 120, a digital video interconnection 230 similar to digital video interconnections 132 and 142, and a display device 240 similar to display devices 135 and 145. GPU 210 includes a source display interface 220. In a particular embodiment, a source display interface is similar to a graphics interface. In another particular embodiment, a source display interface is a sub-system of a graphics interface. Source display interface 220 is coupled to digital video interconnection 230.

Digital video interconnection 230 includes a main data interconnection 232, an auxiliary data interconnection 234, and a hot-plug detection interconnection 236. In a particular embodiment, main data interconnection 232 includes up to four differential pair serial transmission lanes, each lane operating at up to 2.7 gigabits per second (Gbps) for transferring uni-directional, high-bandwidth, low-latency isochronous data streams, such as uncompressed video and audio information, from GPU 210 to display device 240. Auxiliary data interconnection 234 includes a differential pair serial transmission lane operating at up to 400 megabits per second (Mbps) for transferring bi-directional link management and control information between GPU 210 and display device 240. Hot-plug detection interconnection 236 permits display device 240 to be connected to source display interface 220 while the associated information handling system (not illustrated) is in a power-on state.

Display device 240 includes a sink display interface 250 that is connected to digital video interconnection 230. Sink display interface 250 includes a configuration storage 255. Sink display interface 250 receives data streams from main data interconnection 232 for display on a display panel (not illustrated) in display device 240. Sink display interface 250 also shares management and control information with source display interface 220 over auxiliary data interconnection 234. The management and control information includes information contained in configuration storage 255. Source display interface 220 can read information from configuration storage 255 and can write information to configuration storage 255. As such, configuration storage 255 can include volatile storage such as random access memory (RAM), non-volatile storage such as FLASH or read-only memory (ROM), disk drive storage such as hard-disk drives or optical disk drives, another data storage device, or a combination thereof. In a particular embodiment, configuration storage 255 includes DisplayPort Configuration Data (DPCD) as described in the Video Electronics Standards Association (VESA) DisplayPort Standard, version 1.1, Mar. 19, 2007.

Figure 3:
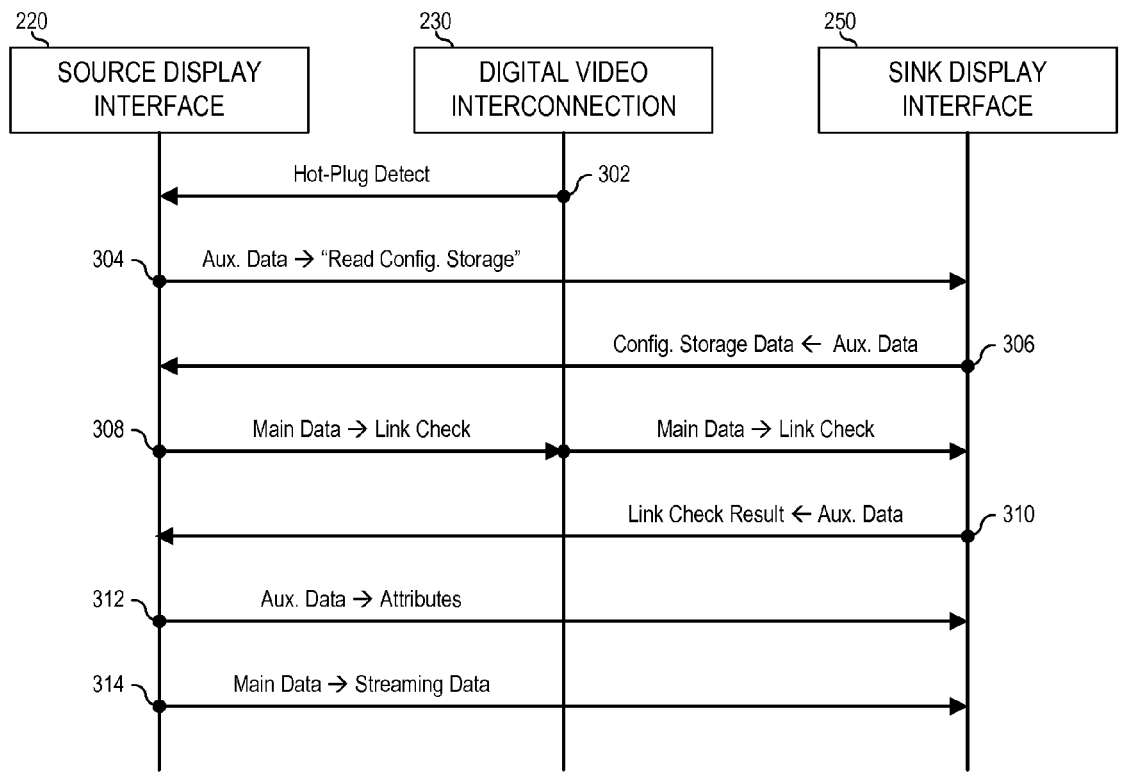
FIG. 3 is a flow diagram illustrating an embodiment of the steps to initialize the display connection of FIG. 2.

FIG. 3 illustrates an embodiment of initializing display connection 200. When, at time 302, a display device 240 is plugged into digital video interconnect 230, hot-plug detection interconnection 236 is asserted to source display interface 220. Source display interface 220 sends a read configuration storage data command on auxiliary data interconnection 234 to sink display interface 250 at time 304. Sink display interface 250 reads configuration storage 255 and sends the data contained therein to source display interface 220 on auxiliary data interconnection 234 at time 306. The data from configuration storage 255 is used by source display interface 220 to determine timing and initialization parameters for main data interconnection 232. Source display interface 220 initiates a link check on each link of main data interconnection 232 at time 308. The link check is received by sink display interface 250. A determination is made in display device 240 if main data interconnection 232 is correctly initialized and sink display interface 250 returns a link check result to source display interface 220 on auxiliary data interconnection 234 at time 310. If main data interconnection 232 is correctly initialized, then source display interface 220 will send other attributes and control information to sink display interface 250 on auxiliary data interconnection 234 at time 312, and will begin streaming content on main data interconnection 234 at time 314. In a particular embodiment, a processor (not illustrated) executes a portion of BIOS/EFI code instructing GPU 210 to initialize display connection 200. In another embodiment, initializing display connection 200 is performed by GPU 210 in response to detecting that display device 240 is plugged into digital video interconnection 230, without instruction from a processor. In yet another embodiment, a combination of processor executed BIOS/EFI code and GPU 210 executed steps are performed to initialize display connection 200.

Figure 4:
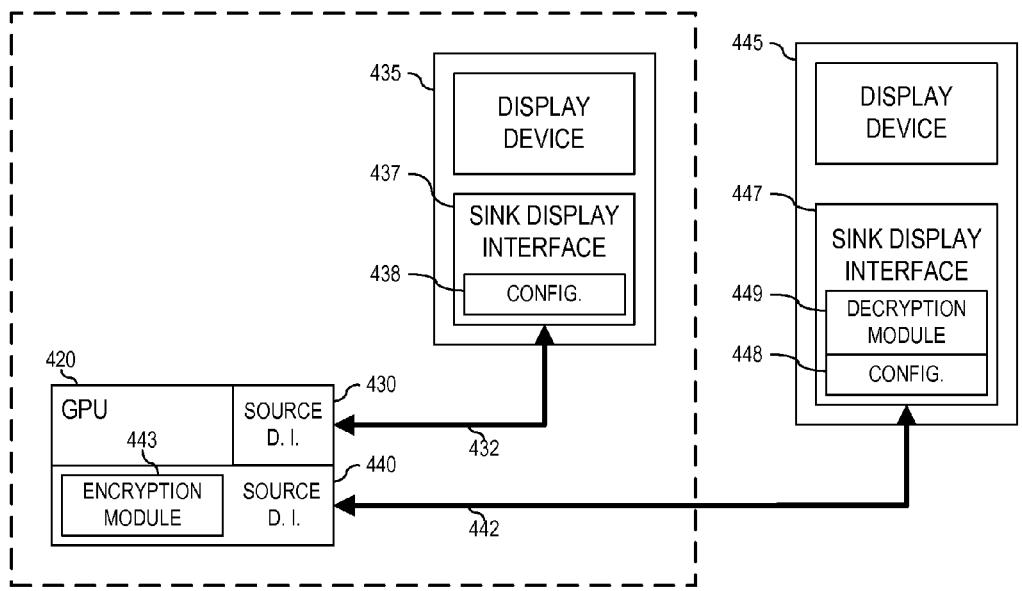
FIG. 4 is a block diagram of an information handling system according to another embodiment of the present disclosure.

FIG. 4 illustrates a functional block diagram of an embodiment of an information handling system 400 similar to information handling system 100, according to an aspect of the present disclosure. Information handling system 400 includes GPU 420 similar to GPU 220, internal display device 435 similar to internal display device 135, and external display device 445 similar to external display device 145. GPU 420 includes an internal source display interface 430, and one or more additional external source display interfaces 440. Internal source display interface 430 is coupled to a sink display interface 437 in internal display device 435 via internal digital video interconnection 432. Similarly, external source display interface 440 is coupled to a sink display interface 447 in external display device 445 via external digital video interconnection 442. External source display interface 440 includes an encryption module 443. Sink display interface 437 includes a configuration storage 438, similar to configuration storage 255. Sink display interface 447 includes a configuration storage 448, similar to configuration storage 255, and a decryption module 449.

In a particular embodiment, external digital video interconnection 442 includes an external connector (not illustrated). The external connector enables information handling system 400 to communicate visual information to a variety of different external display devices 445. Because the visual information on external digital video interconnection 442 is accessible externally to information handling system, and because external digital video interconnection 442 communicates high-bandwidth, high-quality video information, encryption of the video information in external source display interface 440 is desirable before sending the video information. The video information is then decrypted in external display device 445. For this reason, external source display interface 440 includes encryption module 443, and sink display interface 447 includes decryption module 449.

However, internal display device 435 is located in information handling system 400 so as to be designed together with internal source display interface 430. A non-limiting example includes a laptop computer with a graphical processing unit that is coupled to a display that is integrated into a folding cover. Another example includes a mobile computing device with an application specific processor and a display integrated into the case of the mobile computing device. As such, internal digital video interconnection 432 is situated in information handling system 400 such that there is no external connection to internal source display interface 430. For this reason, internal source display interface 430 does not include an encryption module, and sink display interface 437 does not include a decryption module. In a particular embodiment, source display interface 430 can include an encryption module (not illustrated), but can bypass the use thereof upon detecting that the coupled display device is internal display device 435, and not external display device 445. In order to ensure that internal source display interface 430 is coupled to internal display device 435 and not to external display device 445, internal source display interface 430 can read information from configuration storage 438 to authenticate whether or not the display device is internal display device 435 or external display device 445.

Figure 5:
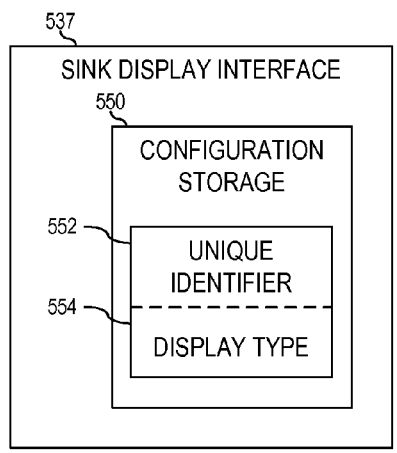
FIG. 5 is an illustration of a sink display interface according to an embodiment of the present disclosure.

FIG. 5 illustrates an embodiment of a sink display interface 537, similar to sink display interface 437 and sink display interface 447, and includes a configuration storage 550, similar to configuration storage 438 and configuration storage 448. Configuration storage 550 includes a unique identifier field 552 and a display type field 554. Unique identifier field 552 can include information that identifies the vendor or manufacturer of the associated display device. Display type field 554 can include information on the type of display panel of the associated display device, or a model number or other identifying information for the associated display device. In a particular embodiment, unique identifier field 552 includes an Organizationally Unique Identifier (OUI) from the Institute of Electrical and Electronics Engineers (IEEE) Registration Authority, and display type field includes registered subfields of the OUI.

In a particular embodiment, a manufacturer can produce a reduced cost and reduced complexity internal display product. The reduction in cost and complexity is a result of excluding decryption hardware or software on the internal display product. The manufacturer will provide unique identifier field 552 and display type field 554 with information that identifies the display product as an internal display product. For example, a manufacturer can make internal LCD panels that are in compliance with the DisplayPort display interface standard. LCD panels that are in compliance with the DisplayPort display interface standard are known as "eDP panels." In one embodiment, the manufacturer can have an OUI associated with its eDP panel, and a configuration storage can include the OUI in an address space beginning at 00400h. The configuration storage is read via an internal source display interface upon initialization of the display connection. If the OUI identifies an eDP panel, then the internal source display interface proceeds to initialize the LCD panel. If the OUI does not identify an eDP panel, then the internal source display interface shuts down the link. In another embodiment, the manufacturer can place information identifying the eDP panel as such in a DisplayPort Configuration Data (DPCD) Capability Field with an address mapped to 0000Ch in the eDP panel's receiver logic. An internal source display interface reads the DPCD Capability Field upon initialization of the display connection. If the DPCD Capability Field identifies an eDP panel, then the internal source display interface proceeds to initialize the LCD panel. If the DPCD Capability Field does not identify an eDP panel, then the internal source display interface shuts down the link.

Figure 6:
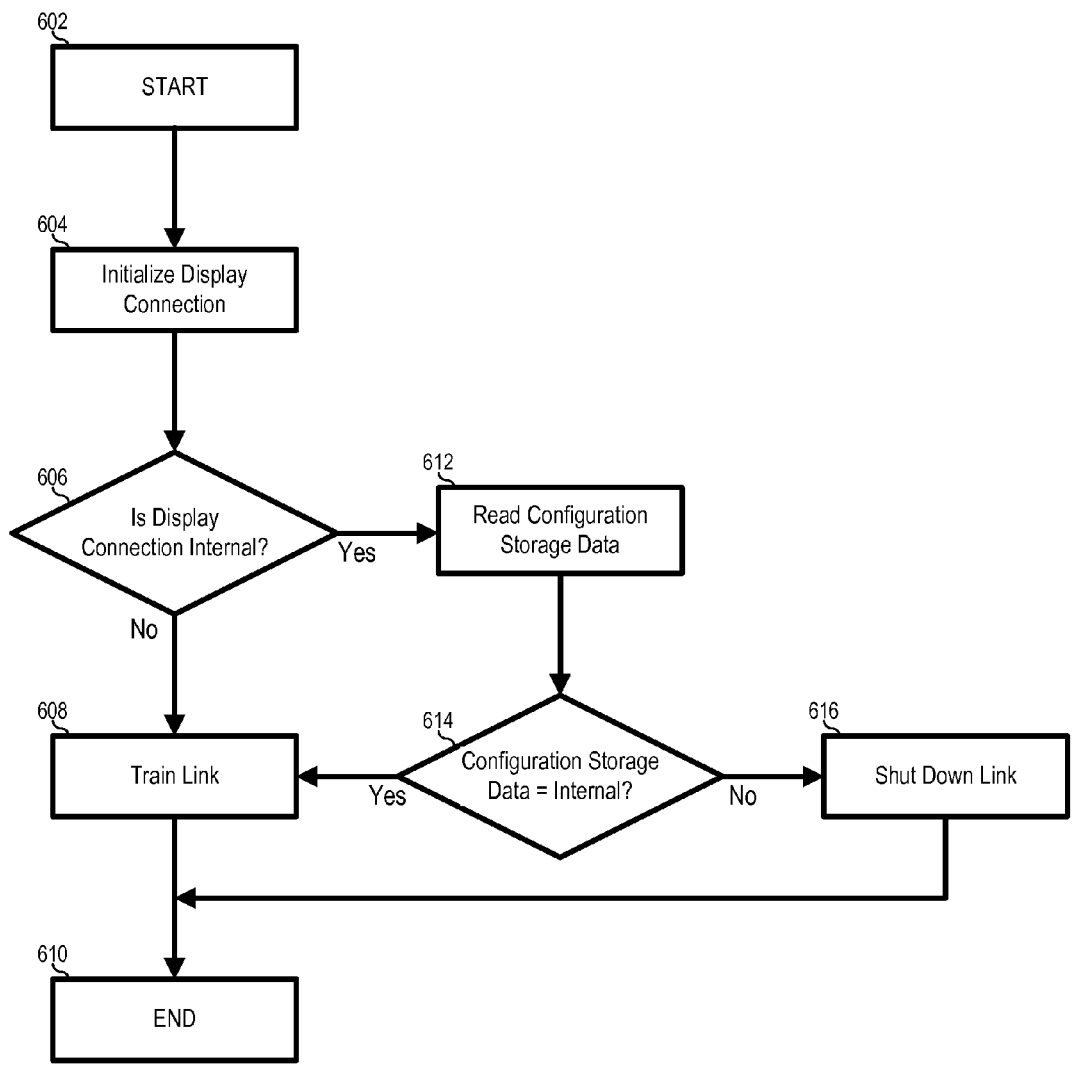
FIG. 6 is a flow chart illustrating an embodiment of a method of authenticating an internal display device.

FIG. 6 illustrates a method of authenticating an internal display device in accordance with an embodiment of the present disclosure. The method starts in block 602. A display connection is initialized in block 604. The initialization can be in response to powering on an information handling system, a resumption of operation of the information handling system after entering a low power state, or another event that calls for an initialization of a display connection. A decision is made in decision block 606 as to whether or not the display connection is an internal display connection. For example, the display connection being initialized may be an internal display connection similar to video interface 430, or may be an external display connection similar to video interface 440. If the display connection is not an internal display connection, then the "NO" branch of decision block 606 is taken, a link of the display connection is trained in block 608, and the method ends in block 610. An example includes training main data interconnection 232 in display connection 200.

If the display connection is an internal display connection, then the "YES" branch of decision block 606 is taken and configuration storage data is read from a display device coupled to the display connection in block 612. A decision is made in decision block 614 as to whether or not the configuration storage data indicates that the display device is an internal display device. If so, then the "YES" branch of decision block 614 is taken, a link of the display connection is trained in block 608, and the method ends in block 610. If the configuration storage data does not indicate that the display device is an internal display device, then the "NO" branch of decision block 614 is taken, the link is shut down in block 616, and the method ends in block 610.

In a first aspect, a computer-implemented method includes determining whether a display connection in an information handling system is an internal display connection or an external display connection, reading configuration information from a display device in response to determining that the display connection is an internal display connection, determining whether the configuration information identifies the display device as an internal display device or an external display device, and training a data link of the display connection in response to determining that the configuration information identifies the display device is an internal display device.

In an embodiment of the first aspect, the computer-implemented method also includes terminating the data link in response to determining that the configuration information identifies the display device as an external display device. In another embodiment, the computer-implemented method includes training the data link in response to determining that the display connection is an external display connection. In yet another embodiment, the data link includes a main link and an auxiliary link. In still another embodiment, training the data link includes sending link check information on the main link, and receiving link check result information on the auxiliary link. In another embodiment, the data link is a DisplayPort data link. In still another embodiment, the configuration information includes an Organizationally Unique Identifier. In yet another embodiment, the Organizationally Unique Identifier identifies the display device as being a liquid crystal display.

In a second aspect, a memory for an information handling system has machine-executable code stored therein that includes instructions for carrying out a method including determining that a first display connection in the information handling system is an internal display connection, reading configuration information from a display device in response to determining that the first display connection is an internal display connection, determining if the configuration information identifies the display device as an internal display device, and training a first data link of the first display connection when the configuration information identifies the display device is an internal display device.

In an embodiment of the second aspect, the method includes determining that a second display connection in the information handling system is an external display connection, and training a second data link of the second display connection in response to determining that the second display connection is an external display connection. In another embodiment, the method includes terminating the first data link when the configuration information does not identify the display device as an internal display device. In yet another embodiment, training the first data link includes sending link check information on a main link of the first data link, and receiving link check result information on an auxiliary link of the first data link. In still another embodiment, the data link is a DisplayPort data link. In yet another embodiment, the configuration information identifies the display device as being a liquid crystal display.

In a third aspect, an information handling system includes a memory with machine-executable code stored therein, a display device, and a graphics processor that executes the machine-executable code. The machine-executable code operates to determine whether a display connection in an information handling system is an internal display connection or an external display connection, read configuration information from a display device in response to determining that the display connection is an internal display connection, determine whether the configuration information identifies the display device as an internal display device or an external display device, and train a data link of the display connection when the configuration information identifies the display device is an internal display device.

In an embodiment of the third aspect, the graphics processor further operates to terminate the data link when the configuration information identifies the display device as an external display device. In another embodiment, the graphics processor further operates to train the data link when the display connection is an external display connection. In yet another embodiment, in training the first data link, the graphics processor further operates to send link check information on a main link of the data link, and receive link check result information on an auxiliary link of the data link. In still another embodiment, the data link is a DisplayPort data link. In yet another embodiment, the configuration information identifies the display device as being a liquid crystal display.

For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a personal data assistant, a consumer electronic device (e.g., a portable music player, a portable DVD player, or a digital video recorder, etc.), a network communication device (e.g., a server or server blade, a storage device, a switch/router, a wireless router, etc.), or any other suitable device, and can vary in size, shape, performance, functionality, and price. An information handling system can also include a set of any of the foregoing devices. The various elements of the information handling system, as described, can be implemented as separate elements, as integrated devices, as logical combinations of separate elements and integrated devices, or as any combination thereof.

Portions of an information handling system, when referred to as a "device," a "module," a "resource," or the like, can be configured as hardware, firmware, software, or any combination thereof. A device, a module, or a resource can be implemented in hardware. A non-limiting example of a device, a module, or a resource implemented as hardware includes: an integrated circuit (e.g., an Application Specific Integrated Circuit (ASIC), a Field Programmable Gate Array (FPGA), a structured ASIC, or a device embedded on a larger chip), a card (e.g., a Peripheral Component Interface (PCI) card, a PCI-Express (PCIe) card, a Personal Computer Memory Card International Association (PCMCIA) card, or other such expansion card), or a system (e.g., a motherboard, a system-on-a-chip (SoC), or a stand-alone device). Similarly, the device, a module, or a resource can be implemented in firmware (i.e., any software running on an embedded device, a Pentium class or PowerPC™ brand processor, or other such device) or in software (i.e., any software capable of operating in the relevant environment). The device, module, or resource can also be implemented as a combination of hardware, firmware, or software. Note that an information handling system can include an integrated circuit or a board-level product having portions thereof that can also be any combination of hardware, firmware, or software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

In the description above, a flow-charted technique can be described in a series of sequential actions. The sequence of the actions and the party performing the steps can be freely changed without departing from the scope of the teachings. Actions can be added, deleted, or altered in several ways. Similarly, the actions can be re-ordered or iterated. Further, although processes, methods, algorithms, or the like can be described in a sequential order, such processes, methods, algorithms, or any combination thereof can be operable to be performed in alternative orders. Further, some actions within a process, method, or algorithm can be performed simultaneously during at least a point in time (e.g., actions performed in parallel), can also be performed in whole, in part, or any combination thereof.

Note that not all of the activities described above in the general description or the examples are required, that a portion of a specific activity can not be required, and that one or more further activities can be performed, in addition to those described. Still further, the order in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments can be apparent to those of skill in the art upon reviewing the disclosure. Other embodiments can be used and derived from the disclosure, such that a structural substitution, logical substitution, or another change can be made without departing from the scope of the disclosure. Accordingly, the disclosure is to be regarded as illustrative rather than restrictive.

Certain features described herein in the context of separate embodiments for the sake of clarity, can also be provided in combination in a single embodiment. Conversely, various features that are, for brevity, described in the context of a single embodiment, can also be provided separately, or in any sub-combination. Further, reference to values stated in ranges includes each and every value within that range.

Benefits, other advantages, and solutions to problems have been described above with regard to specific embodiments. However, the benefits, advantages, solutions to problems, and any feature(s) that can cause any benefit, advantage, or solution to occur, or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A computer-implemented method comprising:
   determining whether a display connection in an information handling system is an internal display connection or an external display connection;
   in response to determining that the display connection is an internal display connection, reading configuration information from a display device, the configuration information including timing and initialization parameters for a data link of the display connection;

determining whether the configuration information identifies the display device as an internal display device or an external display device; and in response to determining that the configuration information identifies the display device is an internal display device, training the data link based on the timing and initialization parameters.

2. The computer-implemented method of claim 1, further comprising, in response to determining that the configuration information identifies the display device as an external display device, terminating the data link.

3. The computer-implemented method of claim 2, further comprising, in response to determining that the display connection is an external display connection, training the data link.

4. The computer-implemented method of claim 1, wherein the data link includes a main link and an auxiliary link.

5. The computer-implemented method of claim 4, wherein training the data link comprises:

sending link check information on the main link; and
receiving link check result information on the auxiliary link.

6. The computer-implemented method of claim 5, wherein the data link is a DisplayPort data link.

7. The computer-implemented method of claim 1, wherein the configuration information includes an Organizationally Unique Identifier.

8. The computer-implemented method of claim 7, wherein the Organizationally Unique Identifier identifies the display device as being a liquid crystal display.

9. A non-transitory memory for an information handling system, wherein the non-transitory memory has machine-executable code stored therein, and wherein the machine-executable code includes instructions for carrying out a method comprising:

determining that a first display connection in the information handling system is an internal display connection;

in response to determining that the first display connection is an internal display connection, reading configuration information from a display device, the configuration information including timing and initialization parameters for a first data link of the first display connection;

determining if the configuration information identifies the display device as an internal display device; and when the configuration information identifies the display device is an internal display device, training the first data link based on the timing and initialization parameters.

10. The memory of claim 9, wherein the method further comprises:

determining that a second display connection in the information handling system is an external display connection; and in response to determining that the second display connection is an external display connection, training a second data link of the second display connection.

11. The memory of claim 10, wherein the method further comprises, when the configuration information does not identify the display device as an internal display device, terminating the first data link.

12. The memory of claim 9, wherein training the first data link comprises:

sending link check information on a main link of the first data link; and
receiving link check result information on an auxiliary link of the first data link.

13. The memory of claim 12, wherein the data link is a DisplayPort data link.

14. The memory of claim 9, wherein the configuration information identifies the display device as being a liquid crystal display.

15. An information handling system comprising:

a memory having machine-executable code stored therein;
a display device; and
a graphics processor operable to execute the machine-executable code to:

determine whether a display connection in an information handling system is an internal display connection or an external display connection;

in response to determining that the display connection is an internal display connection, read configuration information from a display device, the configuration information including timing and initialization parameters for a data link of the display connection;

determine whether the configuration information identifies the display device as an internal display device or an external display device; and when the configuration information identifies the display device is an internal display device, train the data link of the display connection based on the timing and initialization parameters.

16. The information handling system of claim 15, wherein, when the configuration information identifies the display device as an external display device, the graphics processor is further operable to terminate the data link.

17. The information handling system of claim 16, wherein, when the display connection is an external display connection, the graphics processor is further operable to train the data link.

18. The information handling system of claim 15, wherein, in training the first data link, the graphics processor is further operable to:

send link check information on a main link of the data link; and
receive link check result information on an auxiliary link of the data link.

19. The information handling system of claim 15, wherein the data link is a DisplayPort data link.

20. The information handling system of claim 15, wherein the configuration information identifies the display device as being a liquid crystal display.

* * * * *